United States Patent
Fan

[19]

[11] Patent Number: 6,158,267
[45] Date of Patent: Dec. 12, 2000

[54] METHOD AND APPARATUS FOR MODELING THE DYNAMIC EFFECTS ON A GYROSCOPE

[75] Inventor: Zhejun Fan, Dunlap, Ill.

[73] Assignee: Caterpillar Inc., Peoria, Ill.

[21] Appl. No.: 08/811,912

[22] Filed: Mar. 5, 1997

[51] Int. Cl.$^7$ .................................................. G01D 18/00
[52] U.S. Cl. .................................................. 73/1.77
[58] Field of Search .................................. 73/1.77, 1.75

[56] References Cited

U.S. PATENT DOCUMENTS

| | | | |
|---|---|---|---|
| 4,448,086 | 5/1984 | Kennel | 74/5 R |
| 4,461,996 | 7/1984 | Kwon | 324/315 |
| 5,297,028 | 3/1994 | Ishikawa | 364/571.03 |
| 5,414,320 | 5/1995 | Mashio | 310/311 |
| 5,416,585 | 5/1995 | Hadler | 356/350 |
| 5,834,623 | 11/1998 | Ignagni | 73/1.77 |

*Primary Examiner*—Daniel S. Larkin
*Attorney, Agent, or Firm*—Jeffrey L. Myers; James R. Yee; Thomas B. Lindgren

[57] ABSTRACT

An apparatus and method for modeling dynamic effects on a gyroscope. The dynamic effects are represented by a dynamic effects function. The gyroscope is placed in an oven. A test controller, coupled to the oven, controls the oven to modify the temperature of the gyroscope according to a predetermined temperature function, measures an actual temperature value of the test oven and a gyroscope drift value at predetermined time intervals during the predetermined temperature function, and calculates coefficients of the dynamic effects function as a function of the actual temperature and gyroscope drift values at the predetermined time intervals.

6 Claims, 4 Drawing Sheets

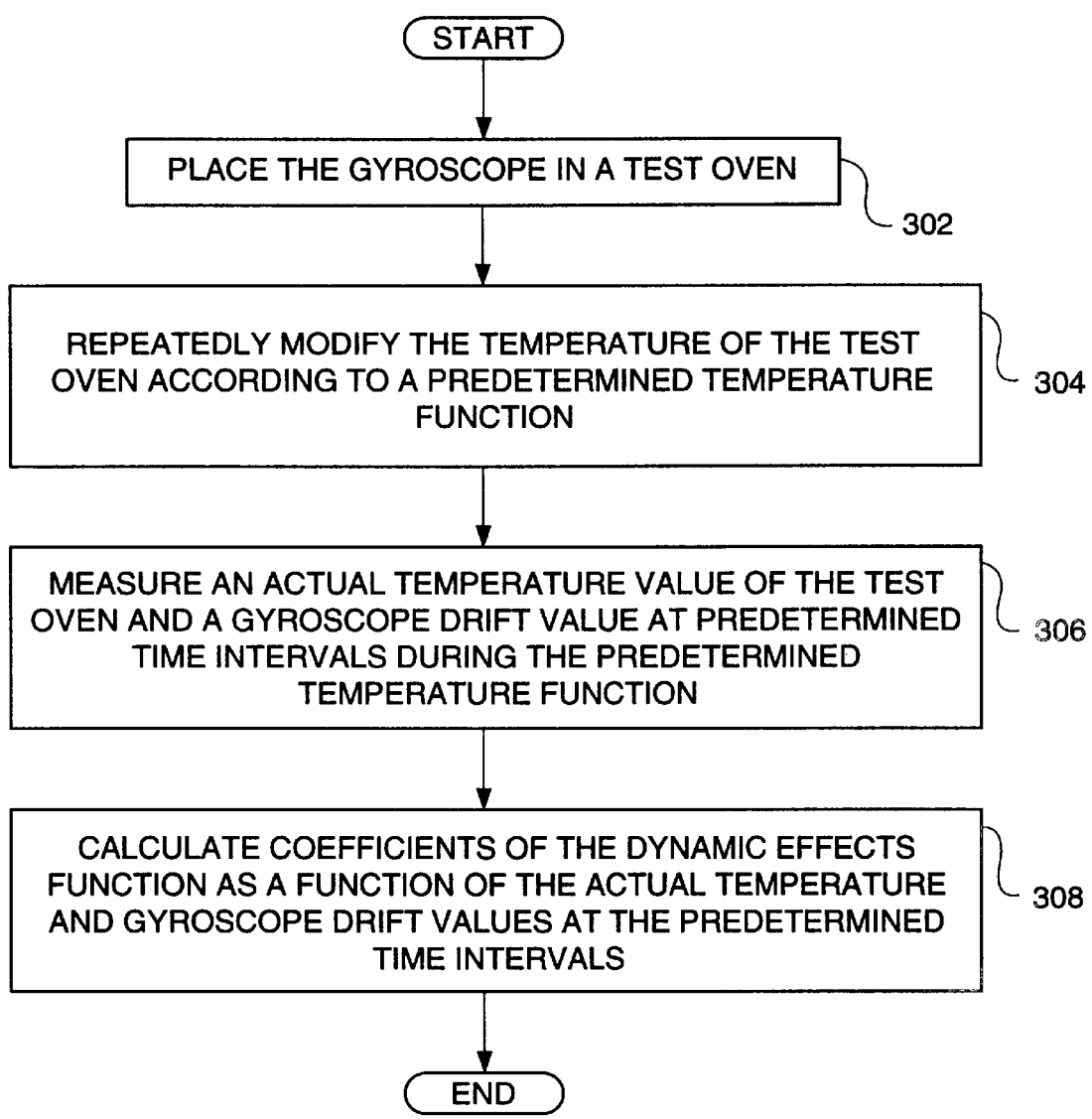

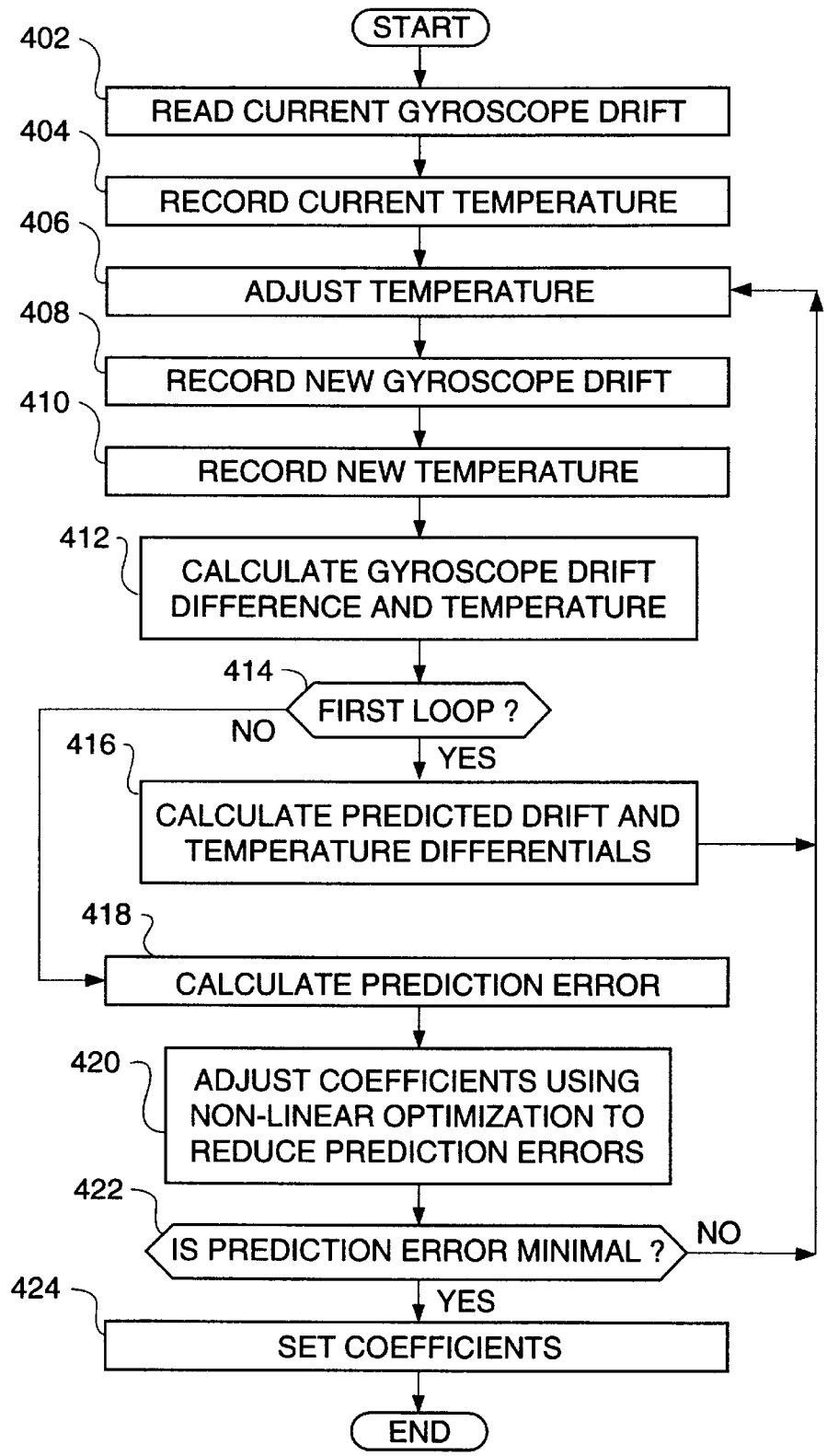

METHOD AND APPARATUS FOR MODELING THE DYNAMIC EFFECTS ON A GYROSCOPE

TECHNICAL FIELD

The present invention relates to gyroscopes, and more particularly, to a method and apparatus for modeling dynamic effects on a gyroscope.

BACKGROUND ART

Computer based aids for earthmoving machines are becoming more common. For example, systems are being developed which utilize the Global Positioning System (GPS) satellites for determining the position of the machine and even the position of an earthmoving tool. For various reasons, GPS satellites are not always reliable. For example, an obstruction might prevent the GPS receiver from receiving signals from the requisite number of satellites in order to make a position determination.

Thus, such position determining systems typically include one or more additional sensors to aid or improve position determinations. One such sensor is an inertial reference unit (IRU) which typically includes a gyroscope for determining heading.

However, a gyroscope's utility is limited by two inherent characteristics. First, gyroscope readings tend to drift over time up to 10 degrees per hour, making them reliable only for short periods of time. Second, gyroscope readings are affected by temperature. A sudden change in temperature can cause heading drift readings to jump up to 100 degrees per hour.

The present invention is directed to overcoming one or more of the problems identified above.

DISCLOSURE OF THE INVENTION

In one aspect of the present invention, a method for modeling temperature effects on a gyroscope is provided. The temperature effects are represented by a temperature effects function. The method includes the steps of placing the gyroscope in a test oven, repeatedly modifying the temperature of the test oven according to a predetermined temperature function, and measuring an actual temperature value of the test oven and a gyroscope drift value at predetermined time intervals during the predetermined temperature function. The method further includes the step of calculating coefficients of the temperature effects function as a function of the actual temperature and gyroscope drift values at the predetermined time intervals.

In another aspect of the present invention, an apparatus for modeling dynamic effects on a gyroscope is provided. The dynamic effects are represented by a dynamic effects function. The apparatus includes a test oven for heating the gyroscope, a test controller, coupled to the test oven, for controlling the test oven to modify the temperature of the gyroscope according to a predetermined temperature function, measuring an actual temperature value of the test oven and a gyroscope drift value at predetermined time intervals during the predetermined temperature function, and calculating coefficients of the dynamic effects function as a function of the actual temperature and gyroscope drift values at the predetermined time intervals.

BRIEF DESCRIPTION OF THE DRAWINGS

FIG. 3 is a flow diagram of a method for modeling dynamic effects on a gyroscope, according to a second embodiment of the present invention; and FIG. 4 is a flow diagram of a method for modeling dynamic effects on a gyroscope, according to a third embodiment of the present invention.

BEST MODE FOR CARRYING OUT THE INVENTION

With reference to the drawings, the present invention provides a method and apparatus for modeling dynamic, including temperature, effects on a gyroscope.

Figure 1:
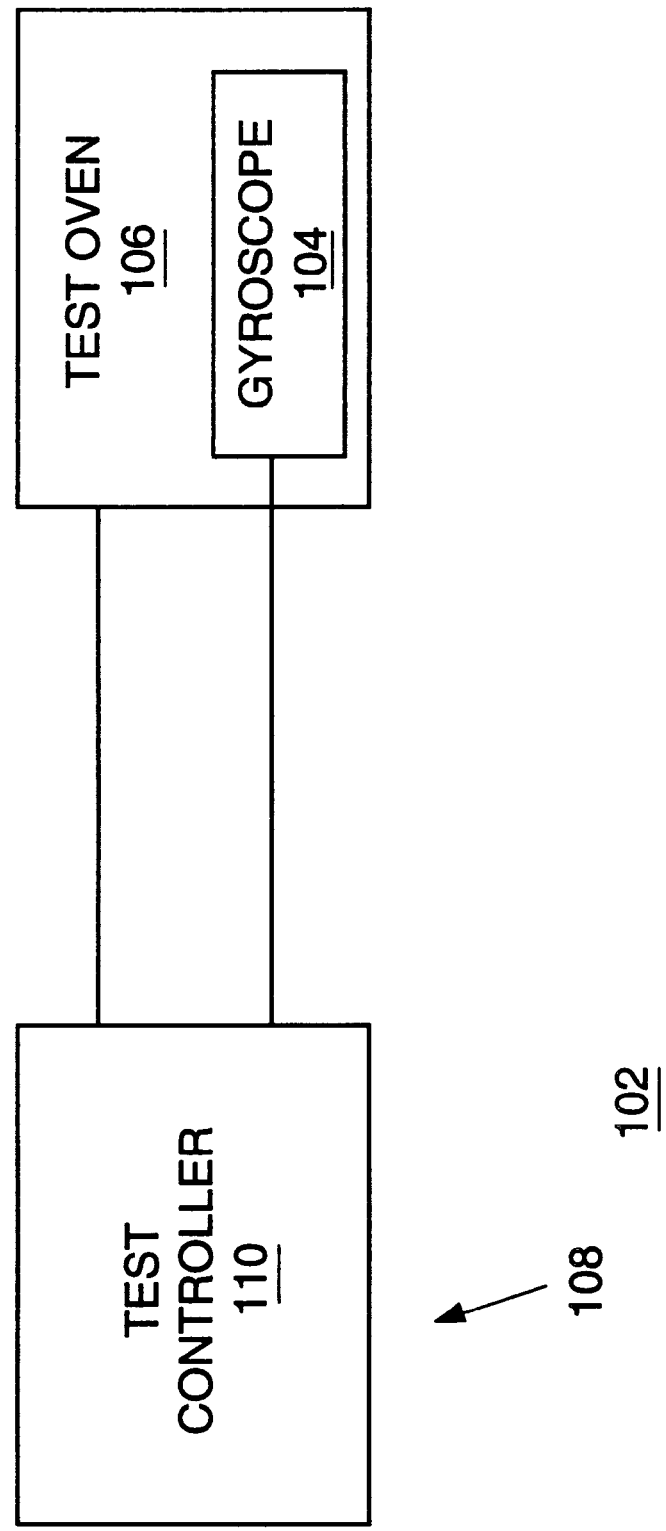
FIG. 1 is a block diagram of an apparatus for modeling dynamic effects on a gyroscope, according to an embodiment of the present invention.

With particular reference to FIG. 1, an apparatus 102 for modeling the dynamic effects on a gyroscope 104 is illustrated, according to an embodiment of the present invention. The dynamic effects are represented by a dynamic effects function (see below).

A test oven 106 is provided for controllably modifying the temperature of the gyroscope 104. The gyroscope 104 is placed within the test oven 106.

A test control means 108 is coupled to the test oven 106 for controlling the test oven 106 to modify the temperature of the gyroscope 104 according to a predetermined temperature function, measuring an actual temperature value of the test oven and a gyroscope drift value at predetermined time intervals during the predetermined temperature function, and calculating coefficients of the dynamic effects function as a function of the actual temperature and gyroscope drift values at the predetermined time intervals. In the preferred embodiment, the test control means 108 includes a microprocessor based test controller 110.

Figure 2:
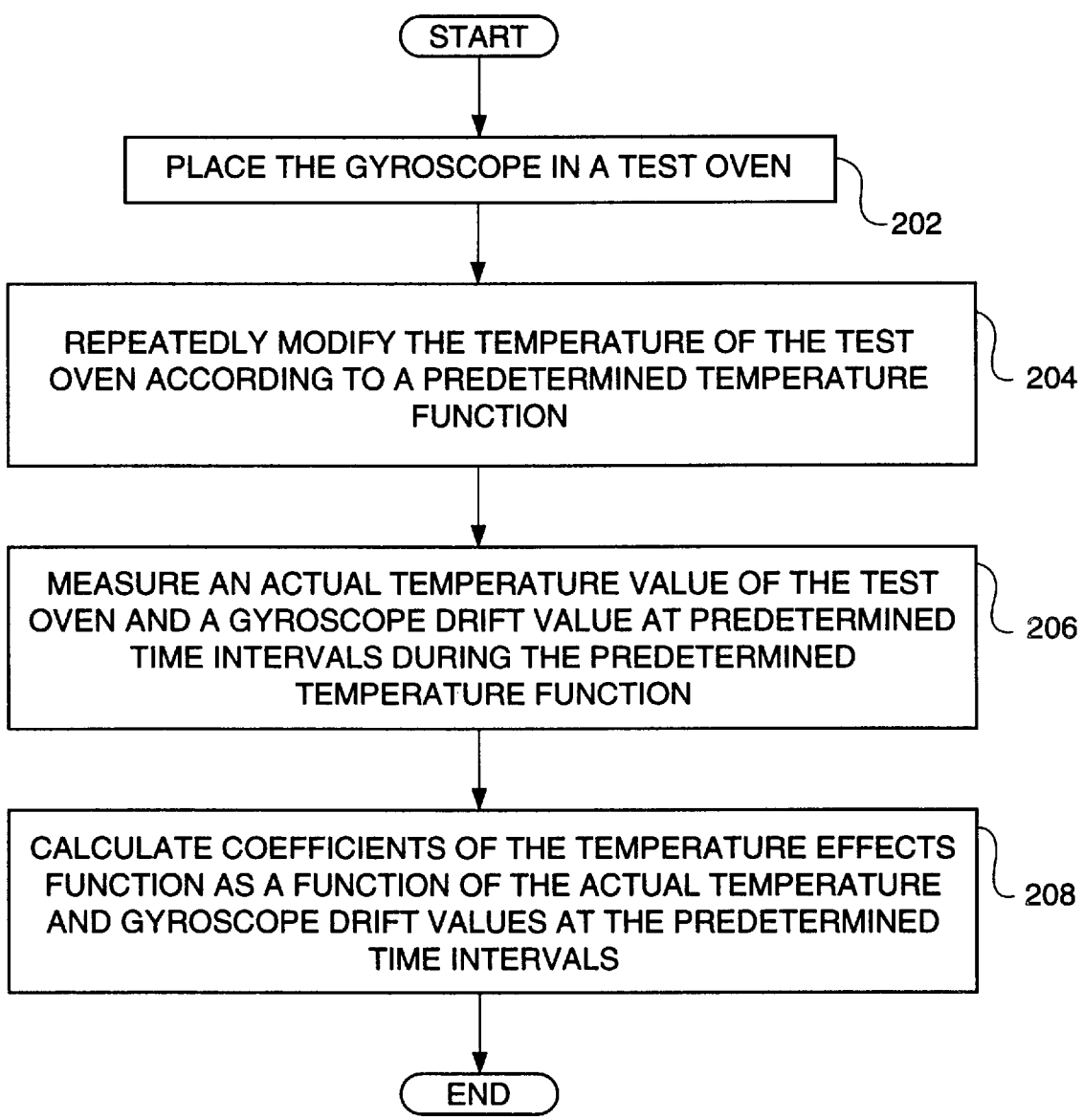
FIG. 2 is a flow diagram of a method for modeling dynamic effects on a gyroscope, according to a first embodiment of the present invention.

With reference to FIG. 2, a method for modeling the temperature effects on a gyroscope 104 is illustrated, according to an embodiment of the present invention. The temperature effects represented by a temperature effects function. In a first control block 202, the gyroscope 104 is placed in a test oven. In a second control block 204, the temperature of the test oven is repeatedly modified according to a predetermined temperature function. In a third control block 206, an actual temperature value of the test oven and a gyroscope drift value are measured at predetermined time intervals during the predetermined temperature function. In a fourth control block 208, the coefficients of the temperature effects function are calculated as a function of the actual temperature and gyroscope drift values at the predetermined time intervals.

With reference to FIG. 3, a method for modeling the dynamic effects on a gyroscope 104 is illustrated, according to a second embodiment of the present invention. The dynamic effects are represented by a dynamic effects function. In a first control block 302, the gyroscope 104 is placed in a test oven 106. In a second control block 304, the temperature of the test oven is repeatedly modified according to a redetermined temperature function. In a third control block 306, an actual temperature value of the test oven and a gyroscope drift value are measured at predetermined time intervals during the predetermined temperature function. In a fourth control block 308, the coefficients of the dynamic effects function are calculated as a function of the actual temperature and gyroscope drift values at the predetermined time intervals.

With reference to FIG. 4, a method for modeling dynamic effects on a gyroscope, according to a third embodiment of the present invention is illustrated. The dynamic effects represented by a dynamic effects function. In the preferred embodiment, the dynamic effects function is a first order equation of the form:

$$\begin{bmatrix} x_1(t) \\ x_2(t) \end{bmatrix} = \begin{bmatrix} \Phi_{11} & \Phi_{12} \\ \Phi_{21} & \Phi_{22} \end{bmatrix} \begin{bmatrix} x_1(t-1) \\ x_2(t-1) \end{bmatrix} + \begin{bmatrix} a_1(t) \\ a_2(t) \end{bmatrix} - \begin{bmatrix} Q_{11} & Q_{12} \\ Q_{21} & Q_{22} \end{bmatrix} \begin{bmatrix} a_1(t-1) \\ a_2(t-1) \end{bmatrix}$$

EQUATION 1 where, $x_1$ represents a gyroscope drift differential, $x_2$ represents a temperature effect differential, $a_1$ represents a noise level associated with gyroscope drift, $a_2$ represents a noise level associated with temperature, $\Phi_{11}$, $\Phi_{12}$, $\Phi_{21}$, $\Phi_{22}$, $Q_{11}$, $Q_{12}$, $Q_{21}$, $Q_{22}$, are equation coefficients, t represents the current time period, and t−1 represents a previous time period.

In another embodiment, the dynamic effects equation may be a higher order equation.

In a first control block 402, the current gyroscope drift is read from the gyroscope 104. Gyroscope drift is one of the outputs of the gyroscope 104 and is preferably measured in degrees/second.

In a second control block 404, the current oven temperature is recorded.

In a third control block 406, the test oven temperature is adjusted according to a predetermined temperature function. In the preferred embodiment, the temperature function is a step function with variations in amplitude. It should be noted that it is important that the temperature function include the maximum and minimum temperature of the intended target environment.

In a fourth control block 408, a new gyroscope drift from the gyroscope 104 is read and recorded.

In a fifth control block 410, a new actual temperature of the oven 106 is read and recorded.

In a sixth control block 412, new temperature and drift differentials are calculated by the following formulas:

$x_1(t)$=current gyroscope drift−previous gyroscope drift;     EQUATION 2 and, $x_2(t)$=current temperature−previous temperature     EQUATION 3

In a first decision block 414, if this is the first time through the algorithm, then control proceeds to a seventh control block 416. Otherwise, control proceeds to an eighth control block 418.

In the seventh control block 416, predicted drift and temperature differentials are calculated.

First, the previous current drift and temperature differentials are set equal to the differentials calculated in the sixth control block 412. Then, new $x_1(t)$ and $x_2(t)$ values are calculated using EQUATION 1 and default values. Exemplary default values are given in TABLE ONE. Control then returns to the third control block 406.

TABLE ONE

EXEMPLARY DEFAULT VALUES.

| | | | |
|---|---|---|---|
| $\Phi_{11}$ | 0.3 | $Q_{11}$ | $0.5 \times 10^{-6}$ |
| $\Phi_{12}$ | $-2 \times 10^{-5}$ | $Q_{12}$ | $1 \times 10^{-7}$ |
| $\Phi_{21}$ | −50 | $Q_{21}$ | $0.2 \times 10^{-6}$ |
| $\Phi_{22}$ | 0.8 | $Q_{22}$ | $1 \times 10^{-5}$ |
| $a_1(t)$ | 0 | $a_1(t-1)$ | 0 |
| $a_2(t)$ | 0 | $a_2(t-1)$ | 0 |

In the eighth control block 418, drift and temperature prediction errors are calculated. In the preferred embodiment, the prediction errors are calculated by:

$$PE_1(t) = x_1(t) - \hat{x}_1(t-1)$$     EQUATION 4 and, $$PE_2(t) = x_2(t) - \hat{x}_2(t-1)$$     EQUATION 5 where, $PE_1(t)$ is the drift prediction error and $PE_2(t)$ is the temperature prediction error, and $\hat{X}_1(t-1)$ and $\hat{X}_2(t-1)$ are prediction values of $x_1(t)$ and $x_2(t)$ at time, t−1.

In a ninth control block 420, the coefficients of the dynamic effects equation ($\Phi_{11}$, $\Phi_{12}$, $\Phi_{21}$, $\Phi_{22}$, $Q_{11}$, $Q_{12}$, $Q_{21}$, $Q_{22}$ of EQUATION 1) are adjusted using non-linear optimization to reduce the prediction errors. Non-linear optimization is well-known in the art and therefore not further discussed. The default values of the coefficients, $\Phi_{11}$, $\Phi_{12}$, $\Phi_{21}$, $\Phi_{22}$, $Q_{11}$, $Q_{22}$, $Q_{21}$, $Q_{22}$, are set equal to the adjusted values. Additionally, $a_1(t)$ and $a_2(t)$ are set equal to $PE_1(t)$ and $PE_2(t)$, respectfully.

In a second decision block 422, if the prediction error is minimal then control proceeds to a tenth control block 424. Otherwise, control returns to the third control block 406.

First, a prediction error (PE) value is calculated using the equation:

$$PE = \frac{1}{N} \sum_{t=n+1}^{N} ((PE_1(t))^2 + (PE_2(t))^2).$$

EQUATION 6

Where N is the total number of sampling points and n is the system order. The coefficient matrix is adjusted to minimize the PE.

In the tenth control block 424, the calculated coefficient values which resulted in the minimal prediction error are used and stored as the coefficients.

Industrial Applicability

With reference to the drawings and in operation, the present invention provides a method and apparatus for modeling the dynamic effects on a gyroscope 104. The gyroscope 104 is placed in a test oven 106. A microprocessor-based test controller controls the temperature of the gyroscope 104 via the test oven 106 according to a predetermined temperature function.

At predetermined time intervals, the gyroscope drift readings and the current actual temperature of the test oven are read. The coefficients of a dynamic effects equation are adjusted to minimize a predicted error using a iterative process (see above).

Once the coefficients of the dynamic effects equation are fixed, the equation can be used to increase the accuracy of the gyroscope over longer time periods.

Other aspects, objects, and advantages of the present invention can be obtained from a study of the drawings, the disclosure and the appended claims.

What is claimed is:

1. A method for modeling temperature effects on a gyroscope, the temperature effects represented by a state space temperature effects function, comprising:

placing the gyroscope in a test oven;

repeatedly modifying the temperature of the test oven according to a predetermined temperature function;

measuring an actual temperature value of the test oven and a gyroscope drift value at predetermined time intervals during the predetermined temperature function; and, calculating coefficients of the state space temperature effects function as a function of the actual temperature and gyroscope drift values at the predetermined time intervals.

2. A method for modeling dynamic effects on a gyroscope, the dynamic effects represented by a state space dynamic effects function, comprising:

placing the gyroscope in a test oven;

repeatedly modifying the temperature of the test oven according to a predetermined temperature function;

measuring an actual temperature value of the test oven and a gyroscope drift value at predetermined time intervals during the predetermined temperature function; and, calculating coefficients of the state space dynamic effects function as a function of the actual temperature and gyroscope drift values at the predetermined time intervals.

3. A method, for modeling dynamic effects on a gyroscope, the dynamic effects represented by a state space dynamics effects function, comprising:

placing the gyroscope in a test oven;

repeatedly modifying the temperature of the test oven according to a predetermined temperature function;

measuring an actual temperature value of the test oven and a gyroscope drift value at predetermined time intervals during the predetermined temperature function; and calculating coefficients of the state space dynamic effects function as a function of the actual temperature and gyroscope drift values at the predetermined time intervals;

wherein the state space dynamic effects function is:

$$\begin{bmatrix} x_1(t) \\ x_2(t) \end{bmatrix} = \begin{bmatrix} \Phi_{11} & \Phi_{12} \\ \Phi_{21} & \Phi_{22} \end{bmatrix} \begin{bmatrix} x_1(t-1) \\ x_2(t-1) \end{bmatrix} + \begin{bmatrix} a_1(t) \\ a_2(t) \end{bmatrix} - \begin{bmatrix} Q_{11} & Q_{12} \\ Q_{21} & Q_{22} \end{bmatrix} \begin{bmatrix} a_1(t-1) \\ a_2(t-1) \end{bmatrix}$$

where $x_1$ represents a gyroscope drift differential, $x_2$ represents a temperature effect differential, $a_1$ represents a noise level associated with gyroscopic drift, $a_2$ represents a noise level associated with temperature, t represents a current time period, t−1 represents a previous time period, $\Phi_{11}$ represents the effect of $x_1(t-1)$ on $x_1(t)$; $\Phi_{12}$ represents the effect of $x_2(t-1)$ on $x_1(t)$; $\Phi_{21}$ represents the effect of $x_1(t-1)$ on $x_2(t)$; $\Phi_{22}$ represents the effect of $x_2(t-1)$ on $x_2(t)$; $Q_{11}$ represents the effect of $a_1(t-1)$ on $x_1(t)$; $Q_{12}$ represents the effect of $a_2(t-1)$ on $x_1(t)$; $Q_{21}$ represents the effect of $a_1(t-1)$ on $x_2(t)$; and $Q_{22}$ represents the effect of $a_2(t-1)$ on $x_2(t)$.

4. A method for iteratively modeling dynamic effects on a gyroscope, the dynamic effects represented by a state space dynamic effects function, comprising:

a) placing the gyroscope in a test oven;

b) reading current gyroscope drift;

c) reading and recording current oven temperature;

d) adjusting oven temperature according to a predetermined temperature function;

e) recording new gyroscope drift;

f) reading and recording new oven temperature;

g) calculating gyroscope drift difference and temperature difference;

h) if first loop of iteration, go to next step; if not first loop, go to step j);

i) calculating predicted drift and temperature differentials and return to step d);

j) calculating prediction error;

k) adjusting the coefficients of the state space dynamic effects function using non-linear optimization to reduce prediction errors; and l) if prediction error is not minimized, return to step d), otherwise set coefficients.

5. A method for iteratively modeling dynamic effects on a gyroscope, the dynamic effects represented by a state space dynamic effects function, comprising:

a) placing the gyroscope in a test oven;

b) reading current gyroscope drift;

c) reading and recording current oven temperature;

d) adjusting oven temperature according to a predetermined temperature function;

e) recording new gyroscope drift;

f) reading and recording new oven temperature;

g) calculating gyroscope drift difference and temperature difference;

h) if first loop of iteration, go to next step; if not first loop, go to step j);

i) calculating predicted drift and temperature differentials and return to step d);

j) calculating prediction error;

k) adjusting the coefficients of the dynamic effects function using non-linear optimization to reduce prediction errors; and l) if prediction error not minimized, return to step d), otherwise set coefficients; wherein the state space dynamic effects function is:

$$\begin{bmatrix} x_1(t) \\ x_2(t) \end{bmatrix} = \begin{bmatrix} \Phi_{11} & \Phi_{12} \\ \Phi_{21} & \Phi_{22} \end{bmatrix} \begin{bmatrix} x_1(t-1) \\ x_2(t-1) \end{bmatrix} + \begin{bmatrix} a_1(t) \\ a_2(t) \end{bmatrix} - \begin{bmatrix} Q_{11} & Q_{12} \\ Q_{21} & Q_{22} \end{bmatrix} \begin{bmatrix} a_1(t-1) \\ a_2(t-1) \end{bmatrix}$$

where $x_1$ represents a gyroscope drift differential, $x_2$ represents a temperature effect differential, $a_1$ represents a noise level associated with gyroscopic drift, $a_2$ represents a noise level associated with temperature, t represents a current time period, t−1 represents a previous time period, $\Phi_{11}$ represents the effect of $x_1(t-1)$ on $x_1(t)$; $\Phi_{12}$ represents the effect of $x_2(t-1)$ on $x_1(t)$; $\Phi_{21}$ represents the effect of $x_1(t-1)$ on $X_2(t)$; $\Phi_{22}$ represents the effect of $x_2(t-1)$ on $x_2(t)$; $Q_{11}$ represents the effect of $a_1(t-1)$ on $x_1(t)$; $Q_{12}$ represents the effect of $a_2(t-1)$ on $x_1(t)$; $Q_{21}$ represents the effect of $a_1(t-1)$ on $x_2(t)$; and $Q_{22}$ represents the effect of $a_2(t-1)$ on $x_2(t)$.

6. An apparatus for modeling dynamic effects on a gyroscope, the dynamic effects represented by a state space dynamic effects function, comprising:

an oven for heating the gyroscope, the gyroscope being placed within the oven;

a test control means coupled to the oven for controlling the oven to modify the temperature of the gyroscope according to a predetermined temperature function, measuring an actual temperature value of the test oven and a gyroscope drift value at predetermined time intervals during the predetermined temperature function, and calculating coefficients of the state space dynamic effects function as a function of the actual temperature and gyroscope drift values at the predetermined time intervals.

* * * * *